Aug. 26, 1969      E. J. WOODBURY ET AL      3,464,026
LASER USING PORRO PRISM END REFLECTORS

Filed June 1, 1965    2 Sheets-Sheet 1

INVENTORS,
ERIC J. WOODBURY,
WALTER R. SOOY.
BY J. K. Haskell
ATTORNEY.

United States Patent Office 3,464,026
Patented Aug. 26, 1969

3,464,026
LASER USING PORRO PRISM END REFLECTORS
Eric J. Woodbury, Tarzana, and Walter R. Sooy, Manhattan Beach, Calif., assignors to Hughes Aircraft Company, Culver City, Calif., a corporation of Delaware
Filed June 1, 1965, Ser. No. 460,235
Int. Cl. H01s 3/02
U.S. Cl. 331—94.5                                      6 Claims This invention relates to a laser and more particularly to a laser configuration that is made up of components which are relatively immune to damage by the laser radiation and deterioration due to environment.

Contrary to the reliability of reflecting elements used in resonant cavities for low power lasers, reflectors used in high power lasers are prone to frequent failure and deterioration. This is due to the fact that most reflecting surfaces are lossy and absorb some incident energy (no metallic or multi-layer dielectric surface reflects 100% of the light incident on it) and therefore become heated to a point of destruction when subjected to laser radiation of very high energy or power. Examples of reflectors that perform well at low energy levels but not at higher levels are silver and multi-layer dielectric coated type mirrors, both of which are readily destroyed by a high intensity laser beam. Also, it is well known that multi-layer dielectric mirrors are very sensitive to environmental conditions and easily damaged thereby.

In an attempt to overcome this unwanted limitation on laser output power, several techniques have been employed. These techniques generally center around the substitution of totally internally reflecting elements such as Porro prisms for the silver coated or multi-layer dielectric coated mirrors making up a laser resonant cavity. Since roof prisms are totally reflective when properly used, there is no absorption and thus no heating effect to destroy them. However, there is a slight loss of light by reflection at the surfaces where light enters and leaves the prism. With this type of closed circuit arrangement, of course, some provision must be made to provide an output for the device, and this again raises problems.

One method of providing an output is to cut or grind off the apex portion of one of the roof prisms so that a portion of the incident laser beam (directed at the apex portion of the prism) is transmitted rather than reflected. However, for most laser applications it is preferable to couple out a fraction of the beam flux over its whole area rather than all of the flux over a fraction of its area.

A method of accomplishing this introduces a beam splitting element or the optical axis of the laser beam within the resonant cavity made up of totally reflecting roof prisms. The beam splitter diverts a portion of the laser energy traversing the resonant cavity in one direction to a new direction along a new optical axis to provide an output. However, the same beam splitter diverts to the new optical axis a portion of the laser energy traversing the resonant cavity in the opposite direction, but this will be in the opposite direction than that desired for an output and is thus lost.

From the foregoing it should be obvious that a laser configuration which is immune to damage by high intensity laser radiation and deterioration due to environment would be a significant advancement in the laser art.

Accordingly, it is an object of the present invention to provide a laser capable of efficient operation at high energy levels.

It is another object of the invention to provide a high power laser which is immune to damage by laser radiation and deterioration due to environment.

It is still another object of the present invention to provide an improved high power laser configuration which is simple to adjust and which can be readily modified for various modes of laser operation.

These and other objects are achieved in a laser according to the invention which comprises a solid-state laser material disposed in a resonant cavity comprising Porro type prisms and pumped to an excited state by a source of pump energy to produce a laser beam along a designated beam axis. An output from the device is provided by a Fresnel beam splitting member disposed on the designated axis for diverting a portion of the laser energy to an output beam axis, one end of which is terminated by a Porro prism member optically coupled to the beam splitting member.

The advantage of this invention over the prior art lies in the complete elimination of all dielectric coatings and other sensitive optical elements while preventing most of the unwanted losses from occurring.

The invention and specific embodiments thereof will be described hereinafter by way of example and with reference to the accompanying drawings wherein like reference numerals indicate like elements or parts, and in which.

Figure 1:
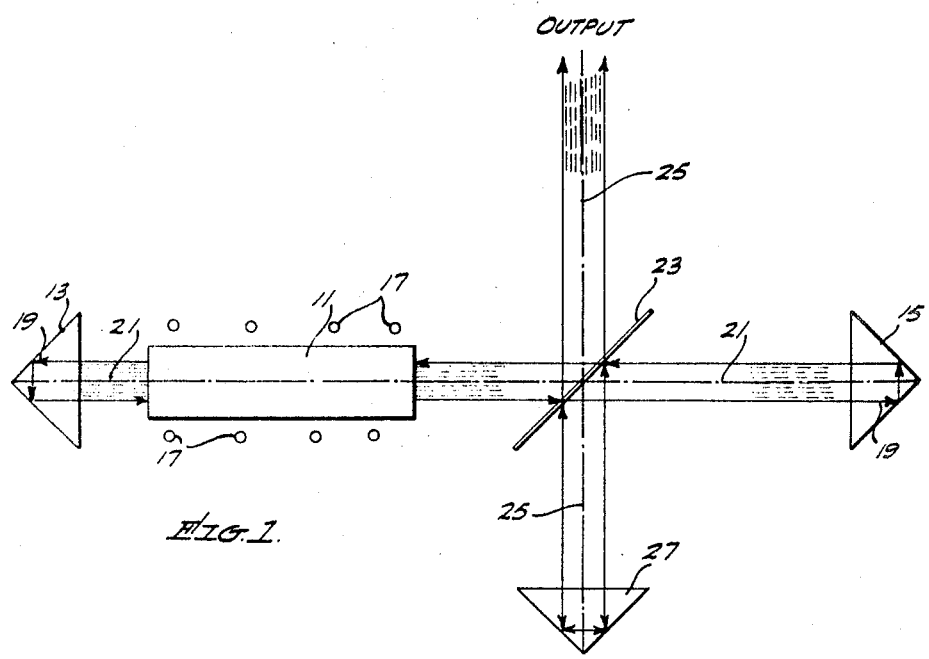
FIG. 1 is a schematic drawing of a laser according to one embodiment of the invention.

With reference now to the drawing and more particularly FIG. 1, there is shown one embodiment of the invention comprising a cylindrical rod 11 of solid-state laser material such as ruby or doped glass, for example, disposed in a resonant cavity made up of two Porro prisms 13 and 15. Surrounding the rod 11 is a helical pump lamp 17 adapted to excite the rod 11 to an excited state so that a laser beam, generally shown by beam tracing arrows 19, is generated along a designated beam axis 21 between the two Porro prisms 13 and 15. In order to provide an output, a Fresnel type beam splitter 23 is placed on the beam axis 21 to intercept the beam traveling to the right and to divert what may be of the order of 10–20% of the beam energy to an upward direction along an output beam axis 25, the inclination of which depends on the angle the beam splitter 23 makes with the axis 21. Here, the beam splitter is at 45° with the axis 21 and the output axis thus is orthogonal to the axis 21. However, the remainder of the beam transmitted through the beam splitter 23 and totally reflected by the Porro prism 15 will also be intercepted by the beam splitter 23 and a portion will be diverted along the output beam axis 25 but in a downward direction. To prevent this loss of laser energy, a further Porro prism 27 is situated in a position to totally reflect this energy along the output beam axis 25 in an upward direction toward the beam splitter 23. A portion of this energy reflected by the Porro prism 27 will be reflected toward the Porro prism 15 along the designated axis 21 by the beam splitter 23 and the remainder will be transmitted along the output beam axis 25 through the splitter 23 in the desired output direction. Thus, it can be seen that all the laser energy remains trapped within the resonant cavity formed by the Porro prisms except for a predetermined portion diverted out of the system by the beam splitter 23.

The amount of energy coupled out as an output may be adjusted by choosing the dielectric constant of the material used for the splitter 23 or by varying its angle with respect to the beam. For example, by the use of a heavy flint glass of dielectric constant approximately 2.0, 20% of the light will be coupled out on each traverse of the cavity. Furthermore, for proper operation, the beam splitter must be a dielectric slab with surfaces optically flat and parallel. Such materials as sapphire and quartz, may also be utilized as well as the flint glass already described.

The Porro prisms are fabricated from any material having an index of refraction equal to or greater than $\sqrt{2}$ or 1.41428. Thus, most glasses, sapphire and quartz, could be used. The design of Porro prisms as well as Fresnel type beam splitters are well known in the optics art and will not be described here. Reference is directed to such texts as "Optics" by F. W. Sears, published by Addison and Wesley Publishing Co., Inc., Mass., 1958, and to "Optics" by Jenkins and White, published by McGraw-Hill Book Co., Inc., N.Y., 1957.

The incident surfaces of the various elements of the embodiment shown in FIG. 1 that are not intended to act as reflecting surfaces should be nondiverting surfaces. The term, nondiverting, is here defined to mean either (1) a surface oriented normal to the incident beam so that the associated Fresnel reflection (4% for glass, typically) is directed back along the incident beam axis, or (2) a Brewster's angle surface that has zero reflection for the incident beam.

Figure 2:
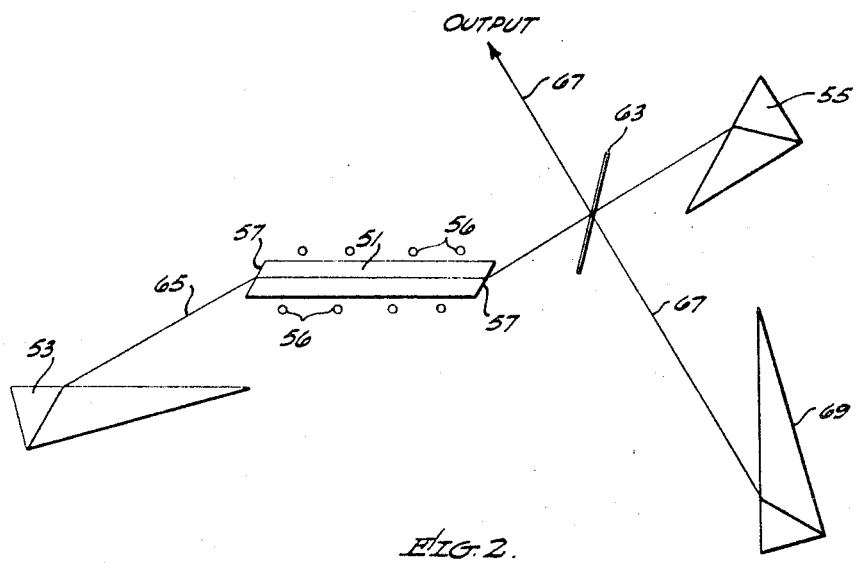
FIG. 2 is a simplified schematic representation of a laser arrangement according to another embodiment of the invention utilizing Brewster's angle surfaces.

FIG. 2 illustrates a very simplified schematic representation of an embodiment of the invention utilizing Brewster's angle surfaces at all but reflecting surfaces. Here, there is shown a cylindrical ruby laser rod 51 disposed in a laser resonant cavity comprised of two quartz Porro prisms 53 and 55. The laser rod 51 is here pumped by a conventional helical flash lamp 56 and the end surfaces 57 of the laser rod 51 are cut or ground to Brewster's angle to prevent unwanted reflections. Also, the light incident surfaces 59 and 61 of the roof prisms 53 and 55, respectively, are cut to Brewster's angle for the same purpose.

For output coupling, a Fresnel beam splitter 63 similar to the beam splitter 23 of FIG. 1 is placed along a designated beam axis 65 to intercept and divert a portion of the laser beam energy traversing the resonant cavity along the axis 65. That portion of the laser energy so diverted will flow along an output beam axis 67 in two directions as described in connection with the embodiment of FIG. 1. The energy traveling in the undesired direction along the axis 67 is reversed or terminated by a Porro prism 69 which also has a Brewster's angle incident surface to prevent losses due to reflections at this interface.

Figure 3:
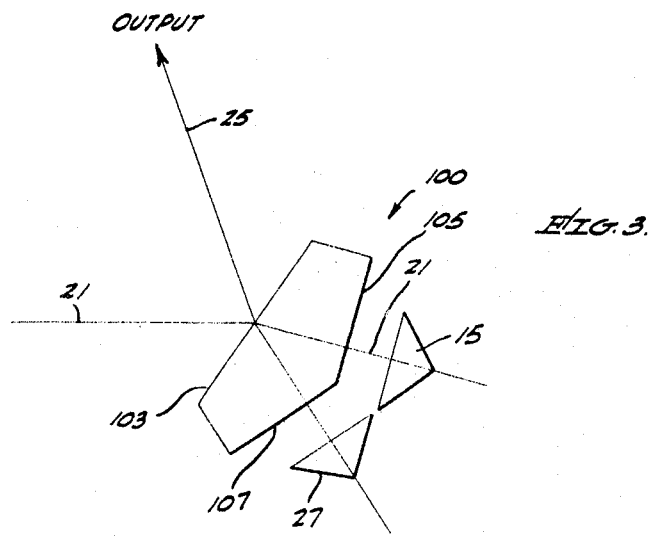
FIGS. 3, 4 and 5 illustrate various beam splitters that may be substituted for the beam splitters shown in FIGS. 1 and 2.

The Fresnel beam splitters 23 and 63 shown in FIGS. 1 and 2 are of the two surface type. This type of beam splitter may be replaced by a single surface type as shown in FIG. 3. Here, a single surface Fresnel beam splitter 100 has a beam splitting surface 103 and non-diverting surfaces 105 and 107. The splitter 100 may be placed on the designated beam axis 21 of the device of FIG. 1 in place of the two surface splitter 23 or in place of the beam splitter 63 in FIG. 2. The design of the beam splitter 100 follows the general laws of reflection and refraction (Snell's law) with an important consideration being that the nondiverting surfaces 105 and 107 are perpendicular to the beam axis of the laser beam passing through the prism-like beam splitter 100. Of course, in order to provide a resonant cavity and to terminate one end of the output beam axis, the Porro prisms 15 and 27 are utilized as shown in FIG. 1, for example. The single surface type device has an advantage over the two surface variety in that the former provides a single image reflection useful in interference pattern experiments, for example, while the latter produces two images slightly displaced which has its own interference pattern and thus is not as desirable in this type of application.

In all the beam splitters mentioned above, it is difficult to obtain large output coupling due to the inherent characteristics of the light beam propagating from a less dense medium to a reflecting-refracting surface of a more dense medium. However, by reversing this procedure by going from a dense medium to a less dense medium, the beam splitter can be made to approach total internal reflection and thus provide large output coupling. A Fresnel type beam splitter 151 constructed according to this concept is illustrated in FIG. 4.

The beam splitter 151 comprises two parts, a first portion 153 and a second portion 155 with a uniform narrow gap 157 between them. The gap 157 is small but not necessarily of wavelength dimensions (1 mil gap, for example), and the angle of incidence of the beam on the gap should be less than the angle at which total internal reflection begins. The outer surfaces of the splitter 151 are cut or ground to be nondiverting to the incident and transmitted energy entering and leaving this device to eliminate possible losses at these surfaces. Again, this beam splitter like the one of FIG. 3 may be substituted for the beam splitters shown in FIGS. 1 and 2.

Figure 4:
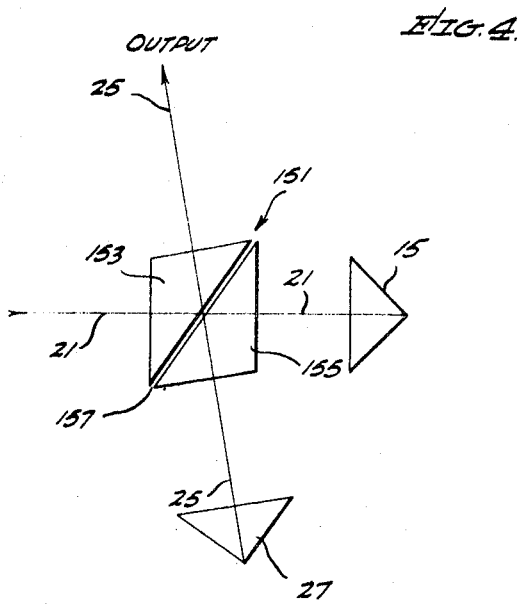

It should be realized that the detached Porro prisms shown in FIGS. 3 and 4 may be attached or made part of the beam splitters themselves without any change in operation of the system.

Figure 5:
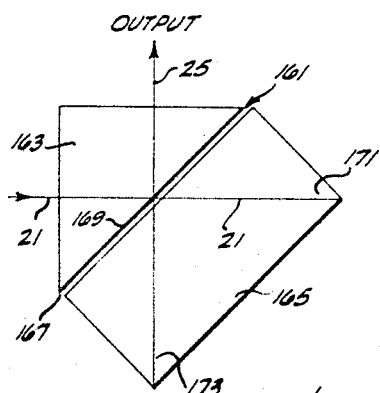

Another type of beam splitter which incorporates the Porro reflecting surfaces is shown in FIG. 5. This figure shows what may be called a frustrated total internal reflection beam splitter 161 comprising a 45°–90° prism portion 163 and a rectangular portion 165 with a very narrow and carefully controlled gap 167 between them. The angle of incidence of the beam on the gap 167 is, in this case, greater than the critical angle (i.e., the index of refraction of the medium is greater than $\sqrt{2}$). The gap 167 is adjusted to be of the order of one wavelength and this device operates on the principle that even though all the light energy incident on the hypotenuse surface 169 of the prism portion 163 is reflected upwardly on the output beam axis 25 there is created an exponentially diminishing field on the other side of the reflecting surface 169. Thus, if a propagating medium such as the rectangular portion 165 is placed very close but not touching this surface, the energy in this field will propagate in the rectangular portion, following the above-mentioned general rules of reflection and refraction so that the beam axis 21 (see FIG. 1) is terminated in a Porro type reflecting corner 171 and the output beam axis 25 is terminated in a Porro type reflecting corner 173. The field, of course, diminishes rapidly with distance and therefore a gap 167 of more than 10 wavelengths will probably not yield a practical device. The narrow gap 167 may be provided by carefully controlled deposition of metal, for example, on one of the adjacent surfaces of the splitter 161 around but not on the area where the two beam axes intersect. The two portions 163 and 165 may then be mechanically held under pressure to assure a constant gap dimension. The fraction of the beam split off depends upon the gap width and can be controlled by controlling the gap.

The three last illustrated beam splitters are not described in great detail because their design is completely within the knowledge of those skilled in the optics art given the functions of the various portions as discussed above.

In all embodiments described above, it should be foreseen that the Fresnel beam splitters 23 and 63 are sensitive to polarization of energy incident thereon and, therefore, normal precautions should be taken to provide proper operation of this element. Furthermore, to prevent depolarization of the laser radiation by the Porro prisms, they should be oriented either parallel or perpendicular to the desired polarization which depends on the laser rod if it has a preferred polarization or on the beam splitter polarization effects if the laser rod has no such preferred polarization. For a more complete description of polarization effects in dielectric media, reference is again directed to the two above-cited publications.

As described, the invention will operate as a simple or normal laser and will exhibit the typical spiked output of such lasers. If, however, either of the roof prisms of the resonant cavity is rotated at high speed, and the flash pumping lamp is properly synchronized with this rotation, pulsed reflector or Q-switched mode operation will result and a single high power or a limited number of high power pulses will be obtained. If even more rapid shuttering is desired, this may be achieved by replacing the rotating roof prism by a Kerr cell and a roof prism. However, this method in general is somewhat difficult to use. A possible alternative method involves the use of a passive Q-switch (saturable dye filter).

As shown in FIG. 1, the roof prisms 13, 15 and 27 all have their roof lines parallel for simplicity of drawing. This is not necessary and, in fact, is not always desirable. For example, by arranging the roof lines of prisms 13 and 15 mutually perpendicular, optical line-up of the apparatus is simplified.

From the foregoing, it can be seen that there has been described a simply constructed laser capable of efficient high power operation, which is immune to damage by laser radiation or environmental deterioration and which can be readily modified for various modes of laser operation.

In practicing the invention, any solid state active laser material may be substituted for the ones described. Also, any suitable type of pumping cavity and pump source may be utilized. For example, the laser rod and a linear pump lamp may be disposed in an elliptical pump cavity for greater pumping efficiency and either pulsed type or continuous operation may be utilized.

Several embodiments have been illustrated and described herein, but it will be appreciated that other organizations of the specific arrangements shown may be made within the spirit and scope of the invention. For example, the roof prism 13 of FIG. 1 may be ground or cut into the end of the laser rod 11 instead of being detached as shown. However, other components or elements not having the same functions and characteristics as those particularly described are not within the scope of this invention. For example, the Porro prisms should not be replaced by other totally internally reflecting elements such as roof cone or corner reflector prisms since these elements will distort the polarization of the system and greatly diminish the advantages of the invention.

What is claimed is:

1. A laser, comprising in combination: means including a pair of Porro prism surfaces for supporting laser energy along a designated beam axis therebetween; solid-state laser material disposed on said designated beam axis and adapted to produce a beam of stimulated light energy along this axis when excited to a lasing state; means coupled to said laser material for exciting said material to said lasing state; and means including a Fresnel beam splitting surface disposed on said designated beam axis for diverting a portion of said light energy to an output axis not coincident with said designated beam axis, and including a Porro prism surface disposed on said output beam axis for terminating one end thereof.

2. A laser, comprising in combination: an optical resonant cavity including two spaced Porro prisms supporting light energy along a designated beam axis therebetween; a solid-state laser rod having two opposite optically flat surfaces orthogonal to the axis of said rod disposed on said designated axis; means for exciting said laser rod to produce a laser beam along said designated axis; means including a Fresnel two-surface beam splitter disposed on said designated axis at 45° thereto for diverting a portion of said laser beam to an output beam axis perpendicular to said designated beam axis; and a Porro prism optically coupled to said beam splitter along said output beam axis and adapted to totally reflect all incident beam energy back along said output beam axis.

3. A laser, comprising in combination: an optical resonant cavity including two spaced Porro prisms supporting light energy along a designated beam axis therebetween, the incident surfaces of said prisms being at the Brewster angle with respect to said designated axis; a solid-state laser rod having two opposite optically flat surfaces at the Brewster angle with respect to the axis of said rod disposed on said designated axis; means for exciting said laser rod to produce a laser beam along said designated axis; means including a Fresnel beam splitter disposed on said designated axis for diverting a portion of said laser beam to an output beam axis not coincident to said designated axis; and a Porro prism disposed on and having an incident surface at the Brewster angle with respect to said output beam axis and adapted to totally reflect all incident beam energy back along said output beam axis.

4. A laser comprising in combination: an optical resonant cavity including two spaced Porro prisms supporting light energy along a designated beam axis therebetween, the incident surfaces of said prisms being perpendicular to said designated beam axis; a solid-state laser rod disposed on said designated axis; means for exciting said laser rod to produce a laser beam along said designated axis; means including a single surface Fresnel beam splitter having a beam splitting surface disposed on said designated axis for diverting a portion of said laser beam to an output beam axis not coincident to said designated axis and having first and second nondiverting surfaces on and perpendicular to said designated and output beam axes, respectively; and a Porro prism disposed on and having an incident surface perpendicular to said output beam axis and adapted to totally reflect all incident beam energy back along said output beam axis to said second nondiverting surface of said beam splitter.

5. A laser, comprising in combination: an optical resonant cavity including two spaced Porro prisms supporting light energy along a designated beam axis therebetween, the incident surfaces of said prisms being perpendicular to said designated beam axis; a solid-state laser rod disposed on said designated axis; means for exciting said laser rod to produce a laser beam along said designated axis; means including a large output coupling Fresnel beam splitter consisting of two parts separated by a uniform narrow gap and disposed on said designated axis for diverting a portion of said laser beam to an output beam axis not coincident with said designated axis, the gap of said beam splitter lying in a plane having an angle of incidence with respect to said beam that is less than the angle at which total internal reflection of an incident beam begins, said beam splitter further having outer surfaces that are nondiverting to incident and transmitted beam energy; and a Porro prism disposed on and having an incident surface perpendicular to said output beam axis and adapted to totally reflect all incident beam energy back along said output beam axis to one of said nondiverting surfaces of said beam splitter.

6. A laser, comprising in combination: an optical resonant cavity including two spaced Porro prisms supporting light energy along a designated beam axis therebetween, the incident surfaces of said prisms being perpendicular to said designated beam axis; a solid-state laser rod disposed on said designated axis; means for exciting said laser rod to produce a laser beam along said designated axis; means including a frustrated total internal reflection beam splitter consisting of a 45°–90° prism portion and a rectangular portion separated by a very narrow and controlled gap of the order of one wavelength and disposed on said designated axis for diverting a portion of said laser beam to an output beam axis not coincident with said designated axis, the gap of said beam splitter lying in a plane having an angle of incidence with respect to said beam that is greater than the critical angle, said beam splitter also having outer surfaces that are nondiverting to incident and transmitted beam energy, said rectangular portion of said beam splitter including one of said pair of Porro prism surfaces and a further Porro prism surface disposed on said output beam axis and adapted to totally reflect all incident beam energy back along said output beam axis to said gap.

References Cited

UNITED STATES PATENTS 2,583,596 1/1952 Root.
3,327,243 6/1967 Stickley _____ 331—94.5

OTHER REFERENCES

Solomon: "Doppler Laser," Electronics, vol. 35, No. 29, p. 26, July 20, 1962.

JEWELL H. PEDERSEN, Primary Examiner

R. L. WIBERT, Assistant Examiner

U.S. Cl. X.R.

88—14